US012798481B2

(12) United States Patent
Austin

(10) Patent No.: US 12,798,481 B2
(45) Date of Patent: Nov. 17, 2026

(54) SUPERIMPOSITION OF TOWBAR REPRESENTATION BETWEEN LEAD AND FOLLOWING VEHICLES

(71) Applicant: Toyota Motor Engineering & Manufacturing North America, Inc., Plano, TX (US)

(72) Inventor: Benjamin Piya Austin, Saline, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 19/056,179

(22) Filed: Feb. 18, 2025

(65) Prior Publication Data

US 2026/0241862 A1 Aug. 20, 2026

(51) Int. Cl.
*B60K 35/28* (2024.01)
*B60R 1/00* (2022.01)

(52) U.S. Cl.
CPC .............. *B60R 1/003* (2013.01); *B60K 35/28* (2024.01); *B60K 2360/347* (2024.01)

(58) Field of Classification Search
CPC .... B60R 1/003; B60K 35/28; B60K 2360/347
See application file for complete search history.

(56) References Cited

U.S. PATENT DOCUMENTS 11,212,654 B2 12/2021 Bai et al.
12,099,353 B2 9/2024 Overfield et al.
2017/0254659 A1* 9/2017 Fukumoto .............. B60K 35/10
2019/0366929 A1* 12/2019 Maruoka .................. B60D 1/36
2020/0108679 A1* 4/2020 Golgiri ..................... B60D 1/26
2021/0191394 A1* 6/2021 Dudley ................. B60W 40/02
2023/0065282 A1* 3/2023 Peranandam ........ G08G 1/0145
2024/0025451 A1* 1/2024 Grace ....................... B60D 1/56
2024/0391380 A1* 11/2024 Maitre ................... B60Q 1/543
2025/0058788 A1* 2/2025 Panthri .................. B60K 35/00

FOREIGN PATENT DOCUMENTS

DE 102010026222 A1 5/2011
DE 102018010096 A1 7/2019

* cited by examiner

*Primary Examiner* — Jessica M Prince

(74) *Attorney, Agent, or Firm* — Christopher G. Darrow; Darrow Mustafa PC

(57) ABSTRACT

Systems, methods, and other embodiments described herein relate to generating a presentation of a towbar between two vehicles where a lead vehicle is at least partially controlling a movement of a following vehicle. In one embodiment, a system includes a processor and a memory storing machine-readable instructions. The machine-readable instructions, when executed by the processor, cause the processor to track, in an output of a vehicle sensor, a location of a rear of a lead vehicle and a front of a following vehicle. The lead vehicle is at least partially controlling a movement of the following vehicle. The machine-readable instructions also cause the processor to superimpose, on a display surface, a representation of a towbar between the lead vehicle and the following vehicle over a real-world view of the rear of the lead vehicle and the front of the following vehicle.

10 Claims, 9 Drawing Sheets

SUPERIMPOSITION OF TOWBAR REPRESENTATION BETWEEN LEAD AND FOLLOWING VEHICLES

TECHNICAL FIELD

The subject matter described herein relates, in general, to a driving scenario where one vehicle is at least partially controlling the movement of a second vehicle and, more particularly, to presenting a representation of a towbar between the two vehicles that are exhibiting coordinated movement.

BACKGROUND

In a hitched configuration, a trailer or another wheeled object is physically coupled to a motorized vehicle such that the motorized vehicle pulls the trailer or other wheeled object along and behind the motorized vehicle. Two vehicles may be joined in a hitchless towing or a virtual connection configuration. In a hitchless/virtual towing configuration, a lead vehicle is manually or autonomously controlled, while a following vehicle is at least partially controlled by the lead vehicle, without any physical mechanical connection between the two vehicles. The following vehicle trails the lead vehicle as if physically coupled to the lead vehicle. Platooning, or convoying, is another configuration in which multiple vehicles maneuver in a coordinated fashion. A vehicle at the front of the platoon or convoy may control the speed and/or maneuvers of the other vehicles.

SUMMARY

In one embodiment, example systems and methods relate to a manner of improving the hitchless/virtual towing arrangement between two vehicles.

In one embodiment, a towbar presentation system for virtually representing a hitchless/virtual towing arrangement between two vehicles is disclosed. The towbar presentation system includes one or more processors and a memory communicably coupled to the one or more processors. The memory stores instructions that, when executed by the one or more processors, cause the one or more processors to track, in an output of a vehicle sensor, a location of a rear of a lead vehicle and a front of a following vehicle. The lead vehicle is at least partially controlling a movement of the following vehicle. The machine-readable instructions also cause the processor to superimpose, on a display surface, a representation of a towbar between the lead vehicle and the following vehicle over a real-world view of the back of the lead vehicle and the front of the following vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
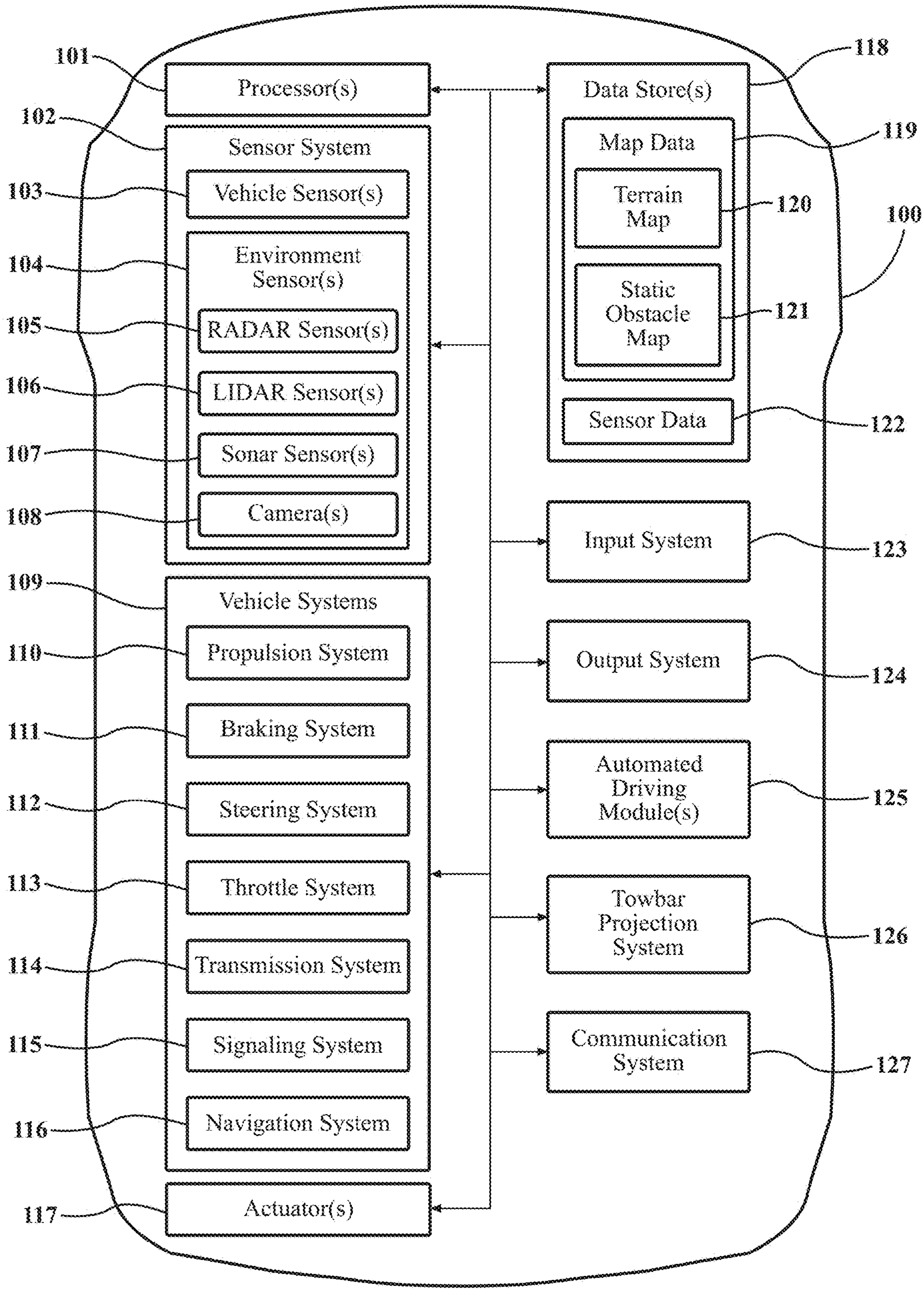
FIG. 1 illustrates one embodiment of a vehicle within which systems and methods disclosed herein may be implemented.

Systems, methods, and other embodiments associated with improving the hitchless towing, virtual towing, convoying, or platooning configuration between multiple vehicles are disclosed herein. As previously described, in a hitched configuration, a trailer or another wheeled object is physically coupled to a motorized vehicle such that the motorized vehicle pulls the trailer or other wheeled object along and behind the motorized vehicle. In a hitchless/virtual towing configuration, there is no physical connection between vehicles. Instead, a lead vehicle issues command instructions either directly to the following vehicle via a wireless connection (Wi-Fi, dedicated short-range communication (DSRC), or vehicle-to-vehicle (V2V), among others) or indirectly through an edge or cloud service. Examples of commands transmitted from the lead vehicle include throttle, steering, and brake commands, among others.

In another example, the following vehicle receives movement data from the lead vehicle, either indirectly through the cloud or directly from the lead vehicle, and controls its vehicle systems to match that of the lead vehicle. Example data received from the lead vehicle includes throttle data, steering data, and brake data, among others. In either of these cases, a vehicle at the front of the arrangement controls the speed and/or maneuvers of the other vehicles in the arrangement. In one specific example, the following vehicle is controlled to match the movement of the lead vehicle, such that both vehicles travel along the same path at the same speed along a roadway. That is, the following vehicle may trail the lead vehicle as if physically coupled to the lead vehicle.

However, such an arrangement may be unnerving to occupants of either the lead vehicle or the following vehicle. Specifically, during virtual towing, the following vehicle may be closer to the lead vehicle than would be the case where the following vehicle is manually operated. Occupants in either vehicle may be unfamiliar or unaccustomed to the smaller distance between the two vehicles. In addition, either driver may take unsafe action to address their stress or anxiety. For example, a driver in a lead vehicle may increase their speed to increase what is perceived to be an unsafe following distance of a following vehicle, notwithstanding the virtual connection is safe and that the short following distance is intended and actively controlled. This increase in speed increases the risk to the lead vehicle, the following vehicle which may similarly speed up to match the speed of the lead vehicle, and other motorists and road users. Similarly, a driver in a following vehicle may attempt to apply brake pressure to increase the following distance. This braking may result in unsafe conditions, for example to rearward vehicles that may not be able to quickly adjust to the rapid braking action of the following vehicle. Still further, the actions of the drivers of the vehicles may contradict the virtual towing control system, which contradictions may introduce complications to the autonomous control of the vehicles. For example, a virtual towing configuration may control the following vehicle to follow at a predetermined distance. Accordingly, as the following vehicle driver applies brake pressure, the autonomous driving module may counter with increased acceleration to maintain the predetermined following distance. In this way, the autonomous driving module may continuously fight the actions of the driver of the vehicle.

Accordingly, the present specification describes a system that increases the awareness and visibility of a lead vehicle-controlled configuration of the following vehicle. Specifically, the present system provides a virtual towing display system that alleviates anxiety, nervousness, and discomfort that may arise in occupants of the vehicles involved in the virtual towing system. This system also enhances the virtual towing technology by preventing the potential conflict between driver and autonomous vehicle controls.

Specifically, the system projects a representation of a towbar over a real-world display of the vehicles to serve as a visual cue that the vehicles are virtually connected. Vehicles equipped with augmented reality display systems may communicate with vehicle sensors such as external and internal cameras, light detection and ranging (LiDAR) sensors, radar sensors, and global positioning system (GPS) sensors, among others to obtain vehicle information relating to a lead vehicle and a following vehicle. Based on this collected data, the system identifies the relative position of the vehicles, which may be driving along a roadway. A display module of the system superimposes a representation of a towbar (e.g., a virtual towbar graphic or an image of a real-world towbar) over a real-world view of the leading vehicle and the following vehicle. The superimposed representation of the towbar may introduce familiarity and comfort to the passengers who may otherwise be anxious or nervous due to an unfamiliar experience of virtual towing. In one particular example, the representation is presented on a transparent display surface of an augmented reality (AR) windshield of a vehicle.

In this way, the disclosed systems, methods, and other embodiments improve virtual towing by providing visual indicia of the virtual connection that may otherwise be unavailable. This prevents potential cross-control of the following vehicle (e.g., human vs. autonomous control) and alleviates user nervousness and anxiety regarding the interaction. That is, the increased transparency regarding control of the following vehicle by a lead vehicle, improves the operation of remote control systems as it increases the safety of the system by preventing potential interruptions, or attempted interruptions, of virtual control. As these interruptions may expose the occupants of the vehicles and motorists to dangers they would not otherwise experience, such as vehicles suddenly accelerating or braking due to a perceived dangerous situation, the operation of the system to prevent these interruptions is a safety-enhancing measure of the autonomous control system described herein.

Referring to FIG. 1, an example of a vehicle 100 is illustrated. As used herein, a "vehicle" is any form of transport that may be motorized or otherwise powered. In one or more implementations, the vehicle 100 is an automobile. While arrangements will be described herein with respect to automobiles, it will be understood that embodiments are not limited to automobiles. In some implementations, the vehicle 100 may be a robotic device or a form of transport that, for example, includes sensors to perceive aspects of the surrounding environment, and thus benefits from the functionality discussed herein associated with the visual announcement of a virtual/hitchless towing configuration.

The vehicle 100 also includes various elements. It will be understood that in various embodiments it may not be necessary for the vehicle 100 to have all of the elements shown in FIG. 1. The vehicle 100 can have different combinations of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, the vehicle 100 includes a towbar presentation system 126 that is implemented to perform methods and other functions as disclosed herein relating to improving virtual towing arrangements.

Figure 2:
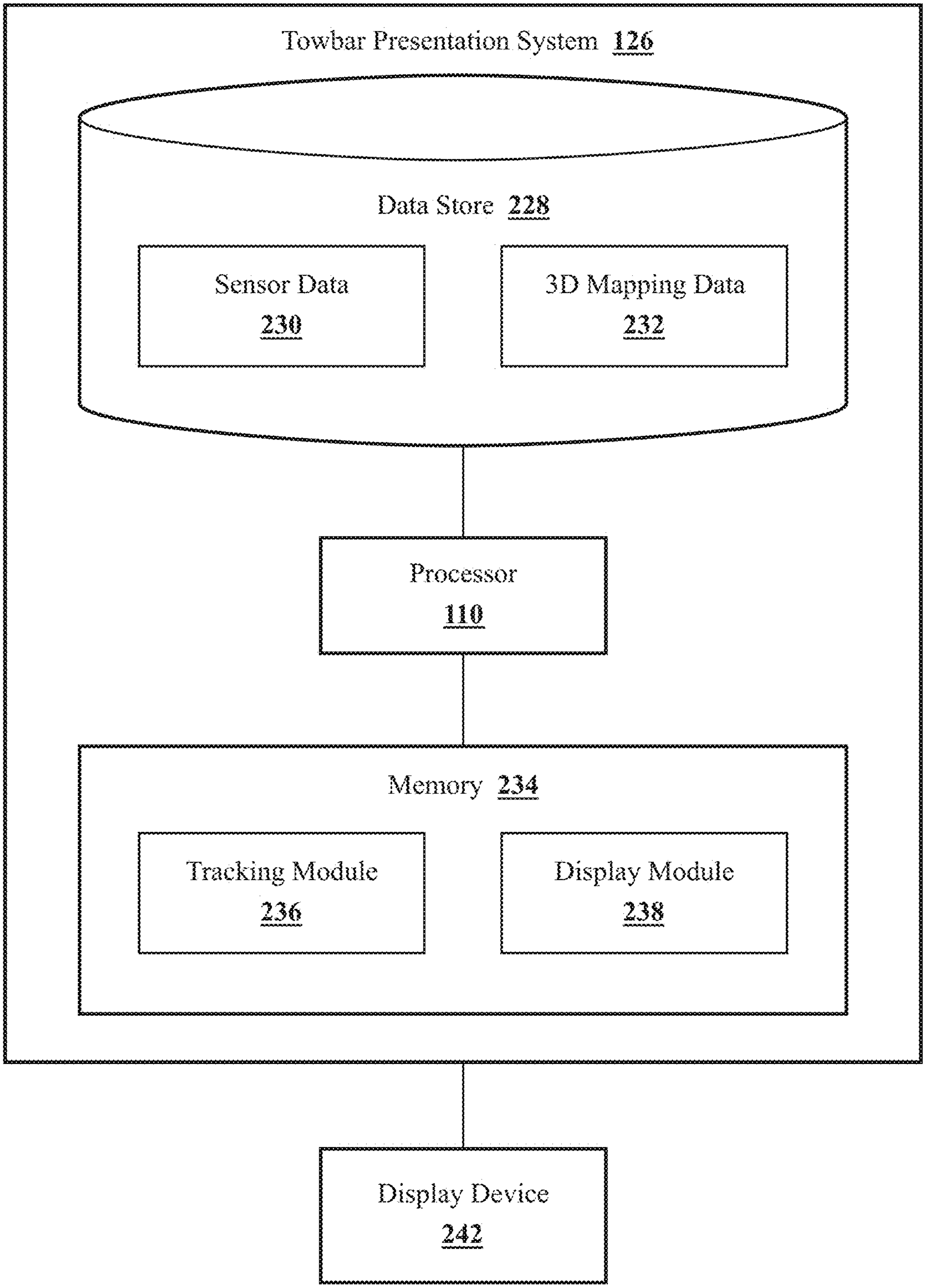
FIG. 2 illustrates one embodiment of a towbar presentation system that is associated with projecting a representation of a towbar between two traveling vehicles.

With reference to FIG. 2, one embodiment of the towbar presentation system 126 of FIG. 1 is further illustrated. The towbar presentation system 126 is shown as including a processor 231. In an example, the processor 231 may be the processor 101 from the vehicle 100 of FIG. 1. Accordingly, the processor 231 may be a part of the towbar presentation system 126, the towbar presentation system 126 may include a separate processor from the processor 101 of the vehicle 100, or the towbar presentation system 126 may access the processor 101 through a data bus or another communication path that is separate from the vehicle 100.

In one embodiment, the towbar presentation system 126 includes a memory 234 that stores a tracking module 236 and a display module 238. The memory 234 is a random-access memory (RAM), read-only memory (ROM), a hard-disk drive, a flash memory, or another suitable memory for storing the modules 236 and 238. The modules 236 and 238 are, for example, computer-readable instructions that when executed by the processor 231 cause the processor 231 to perform the various functions disclosed herein. In alternative arrangements, the modules 236 and 238 are independent elements from the memory 234 that are, for example, comprised of hardware elements. Thus, the modules 236 and 238 are alternatively ASICs, hardware-based controllers, a composition of logic gates, or another hardware-based solution.

Moreover, in one embodiment, the towbar presentation system 126 includes the data store 228. In an example, the data store 228 may be the data store 118 depicted in FIG. 1. In another example, the data store 228 is separate from the data store 118 depicted in FIG. 1.

The data store 228 is, in one embodiment, an electronic data structure stored in the memory 234 or another data storage device and that is configured with routines that can be executed by the processor 231 for analyzing stored data, providing stored data, organizing stored data, and so on. Thus, in one embodiment, the data store 228 stores data used by the modules 236 and 238 in executing various functions.

Figure 3A:
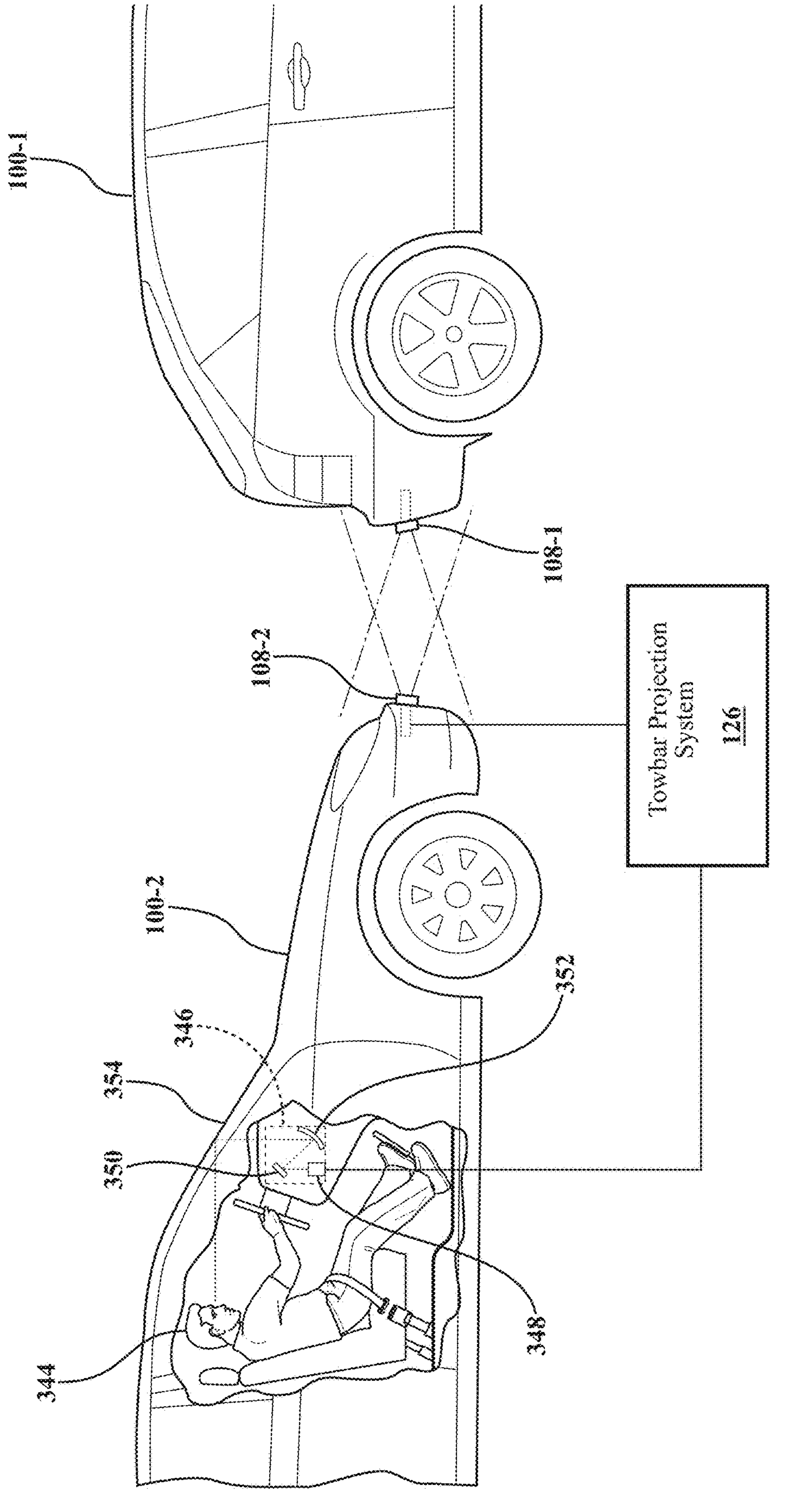
FIGS. 3A and 3B illustrate embodiments of a projection device for projecting a representation of a towbar between two traveling vehicles.

In one embodiment, the data store 228 stores the sensor data 230 by which the towbar presentation system 126 determines where a representation of a towbar is to be placed on a display surface. That is, in general, the sensor data 230 includes data relied on by the modules 236 and 238 to determine the relative location of the lead vehicle and the following vehicle. That is, as depicted in FIG. 3A, two vehicles may be in a virtual or hitchless towing arrangement where a lead vehicle at least partially controls the movement of a following vehicle. To assuage occupant anxiety, the display module 238 interfaces with a display device 242, which may be an augmented reality (AR) projection device, to project a representation of the virtual connection in the form of a digital towbar placed between the lead vehicle and the following vehicle.

Figure 4A:
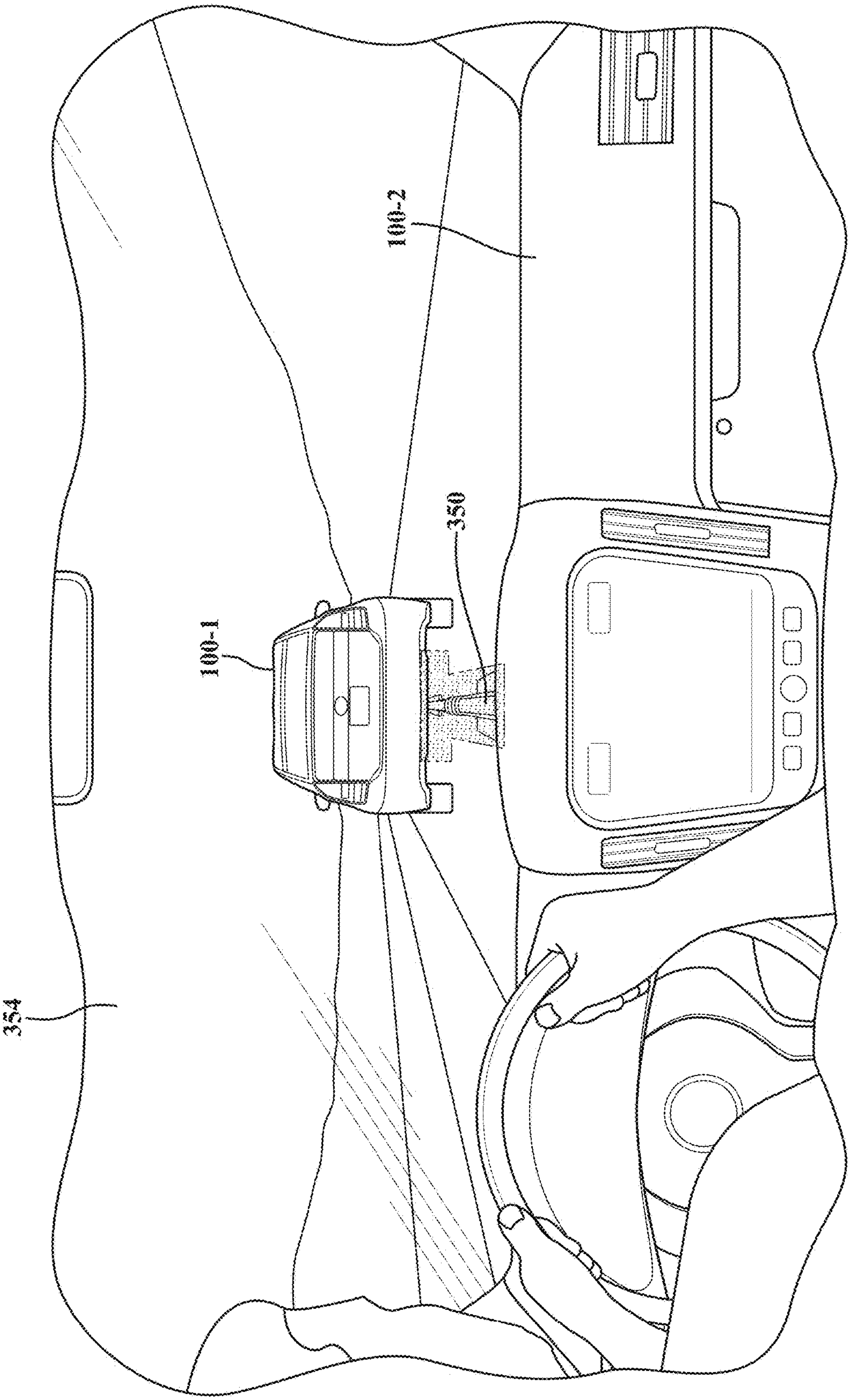
FIGS. 4A-4D illustrate embodiments of the projection of a representation of a towbar between two traveling vehicles.
Figure 4B:
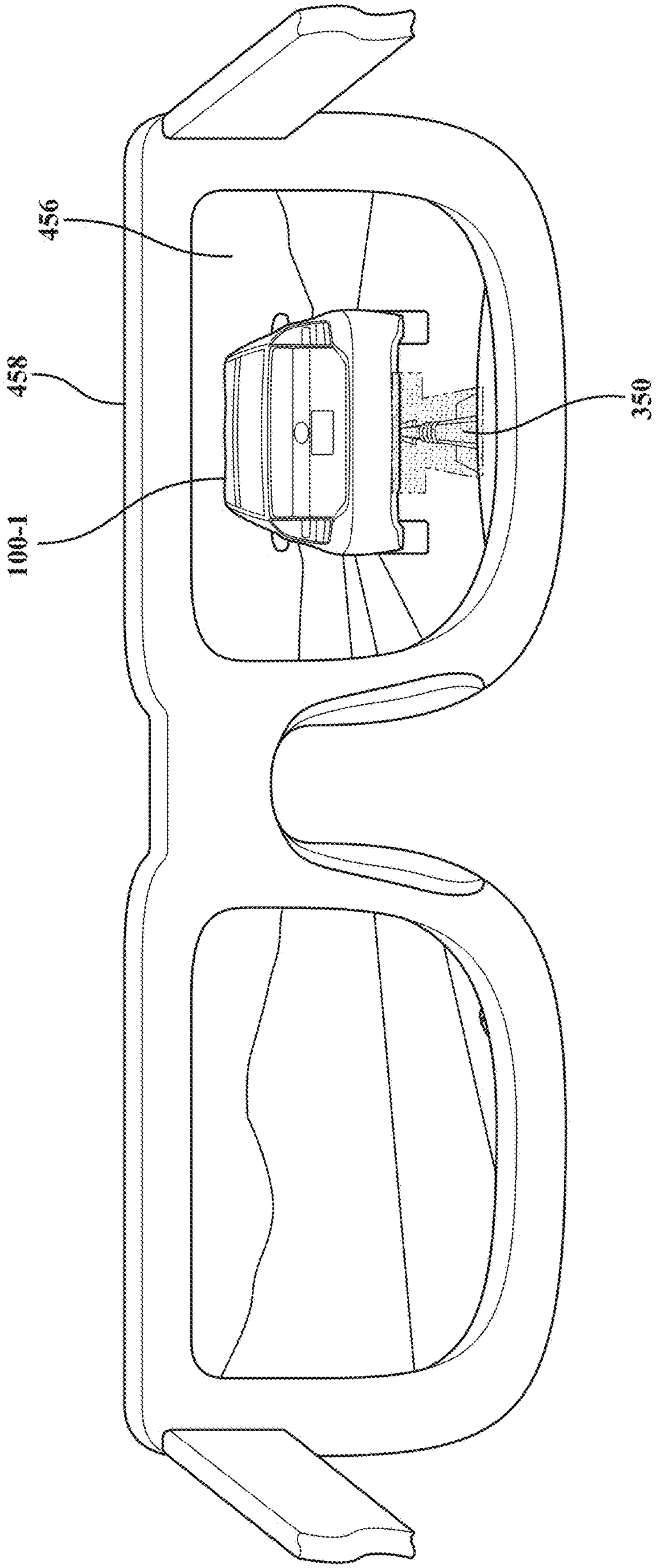
Figure 4C:
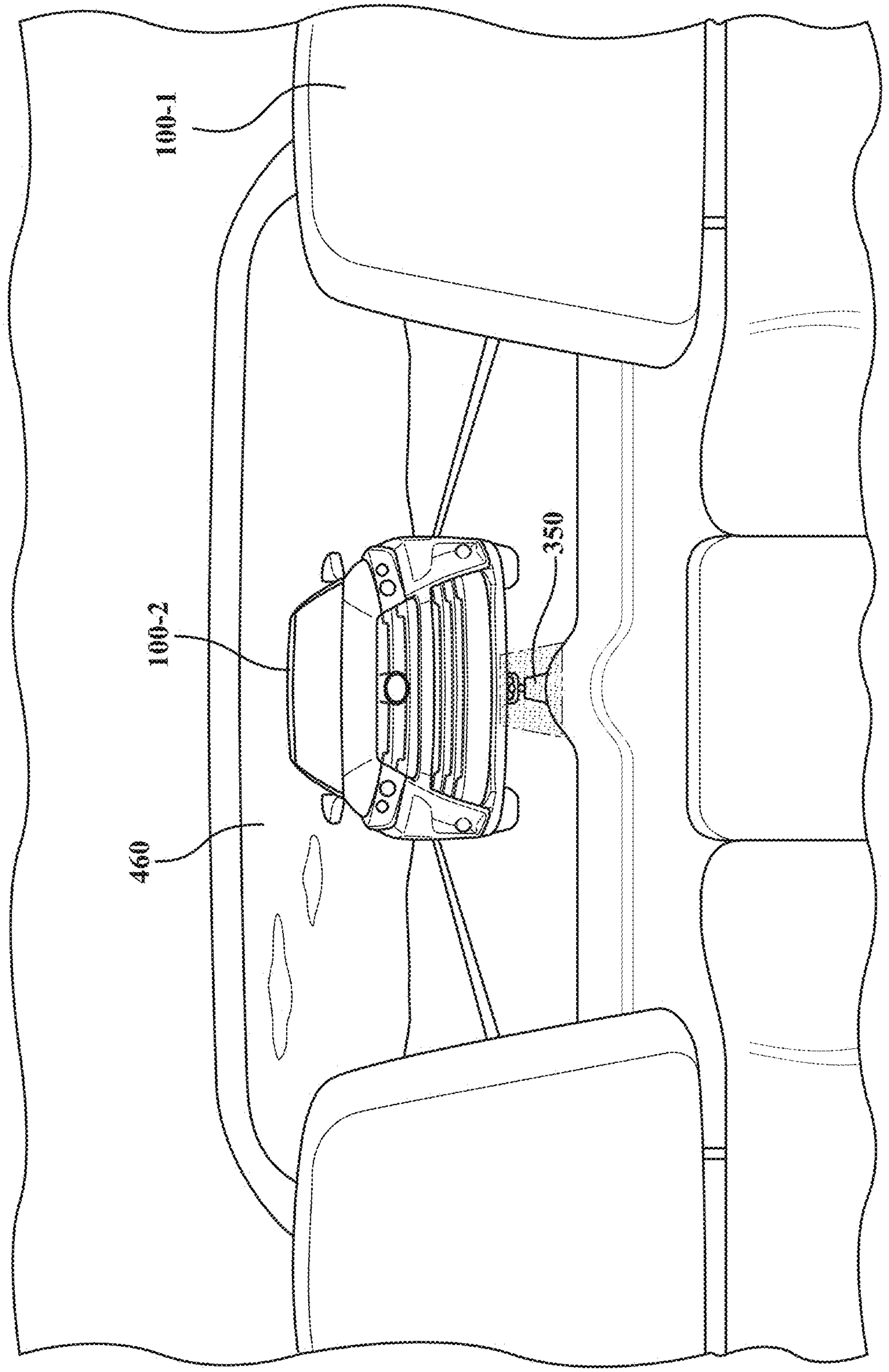
Figure 4D:
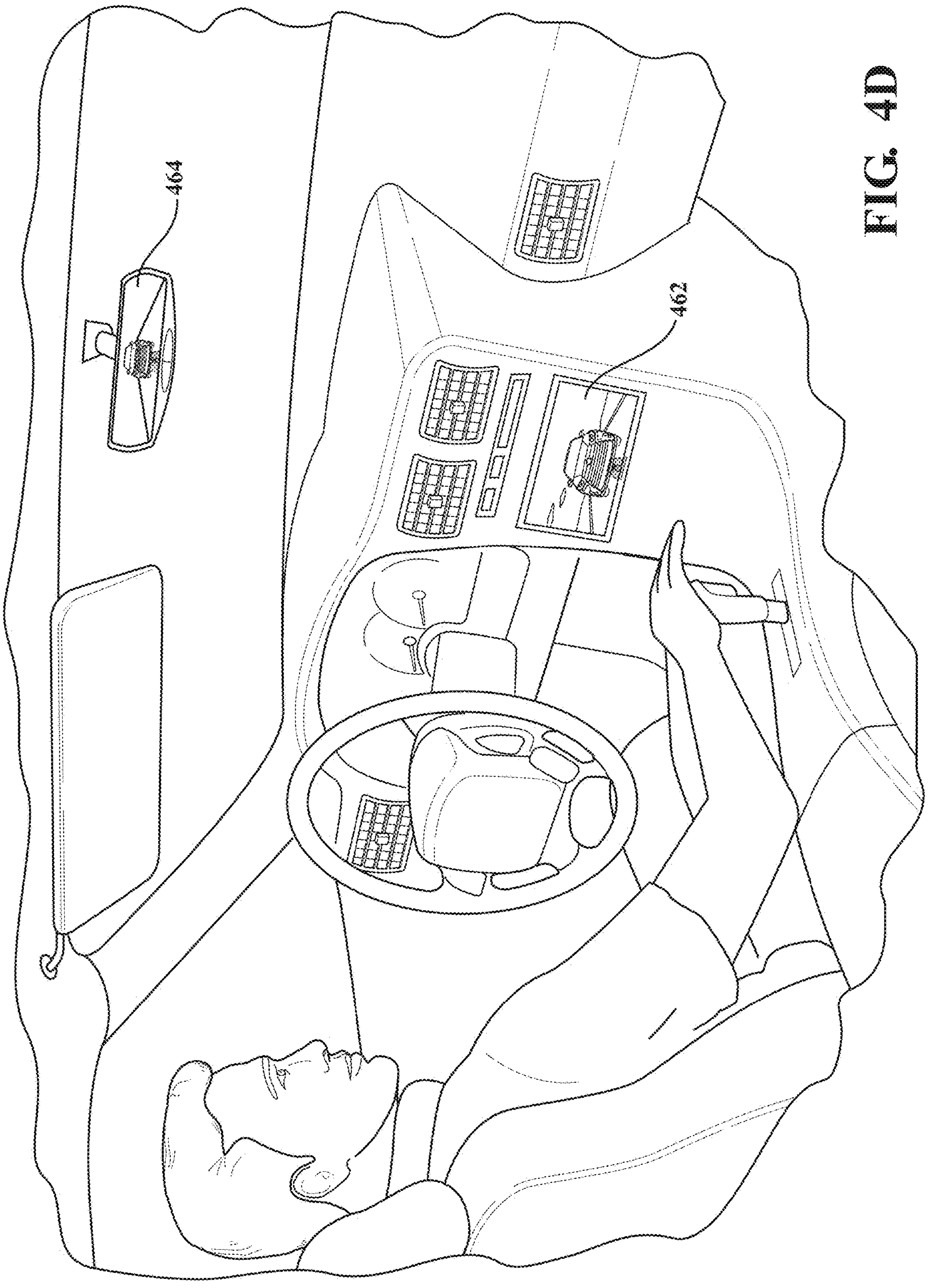

The defining parameters of the projected representation may be based on the physical attributes of the vehicles, such as their relative location and position. Specifically, the representation of the towbar is based on the location and position of an ado vehicle. That is, the projection may be made on a display surface of a lead vehicle, in which case the real-world following vehicle and a representation of the towbar may be presented as depicted in FIGS. 4C and 4D. In another example, the projection may be made on a display surface of a following vehicle, in which case the real-world lead vehicle and a representation of the towbar may be presented as depicted in FIGS. 4A and 4B. In either case, the defining parameters of the representation may be based on the position of the ado vehicle, whether the ado vehicle is the lead vehicle or the following vehicle. Accordingly, the sensor data 230 may include data indicating the position and/or location of the ado vehicle. Examples of sensor data 230 include the output of outwardly facing cameras 108, such as a rearward-facing camera on a lead vehicle or a forward-facing camera on a following vehicle. Other examples of sensor data include the output of depth sensors such as LiDAR sensors 106, radar sensors 105, and sonar sensors 107, each of which may perceive the presence of nearby objects in the vicinity of the vehicle such as the other vehicle in the virtual towing configuration.

In an example, the representation of the towbar is also based on the location and position of the ego vehicle, whether the ego vehicle is a lead vehicle or a following vehicle. Accordingly, the sensor data 230 may include data indicating the position and/or location of the ego vehicle. Example information may include GPS coordinates from a GPS sensor, an inertial measurement unit (IMU), and an accelerometer among others.

As another example, the sensor data 230 may include the output of in-cabin sensors. For example, as described below in connection with the tracking module 236 and FIG. 5, the perspective of the projection may be altered based on the position of the occupant of a vehicle 100. For example, a driver of the following vehicle may have a different viewing angle of the rear of the lead vehicle as compared to another occupant of the vehicle 100. Moreover, the driver may change their head position from side to side, offering them a different viewing angle of the real world. In this example, the towbar presentation system 126 may alter the presentation of the towbar to align with the viewing angle of the driver and/or passenger. Accordingly, the sensor data 230 may include the output of in-cabin cameras, such that a gaze angle, seating position, and head position of one or more occupants of the vehicle 100 may be determined such that the display module 238 may generate an appropriately oriented representation of the towbar.

In one embodiment, the data store 228 stores the sensor data 230 along with, for example, metadata that characterizes various aspects of the sensor data 230. For example, the metadata can include location coordinates (e.g., longitude and latitude), relative map coordinates or tile identifiers, time/date stamps from when the separate sensor data 230 was generated, and so on. As an example, over time, as the vehicles travel on a roadway, the pose and orientation of a vehicle may change, as may the relative distance between vehicles. For example, as a lead vehicle applies brake pressure or turns a corner, the distance between the vehicles and the relative positions of the vehicles may change. In this example, the towbar presentation system 126 may continuously update the representation of the towbar to align with the current relative pose and position of the vehicles. In this example, the sensor data 230 may include a time series of sensor data 230 with metadata indicating the timestamps associated with collected data.

In one embodiment, the data store 228 further includes 3D mapping data 232. In an example, it may be the case that the outwardly-facing cameras and other sensors that capture perceptions of the environment are provided from a different perspective than that from which the occupant of the vehicle 100 views the environment. For example, as depicted in FIG. 3A, a forward-facing camera may be positioned lower to the ground and closer to a lead vehicle than the driver of the following vehicle. During the generation of the representation of the towbar, the coordinates of the sensor data, or the coordinates of anchor points in the sensor data, may be converted from one perspective or viewing angle to another such that the representation of the towbar aligns with the perspective of the occupant. In this example, the 3D mapping data 232 may include data that maps three-dimensional coordinates of objects identified in the sensor data (e.g., camera images, LiDAR, radar, and sonar sensor output) to coordinates of the objects from the perspective of the vehicle occupant. Put another way, the towbar presentation system 126 may account for the spatial relationship between the sensors of the vehicle 100 and the position of the passengers of the vehicle 100. In an example, the spatial relationship may be logged in a lookup table. Specifically, the 3D mapping data 232 may include perspective transfer information for various occupant positions. That is, the perspective transformation of the anchor points may be different based on the position of the occupant. Accordingly, the 3D mapping data 232 may indicate how the anchor point coordinates should be adjusted based on the various positions of the occupant within the vehicle. As described below in more detail, once the position of the occupant is determined, the display module 238 may, relying on the perspective-changing 3D mapping data 232, convert the anchor points from a sensor-based perspective to an occupant-based perspective. Such a lookup operation may be performed periodically as the occupant shifts position.

As described above, the towbar presentation system 126 may include a tracking module 236 and a display module 238. In general, the tracking module 236 identifies and tracks the location of various objects. Of particular interest to the present application, the tracking module 236 identifies and tracks the location of the rear (e.g., a rear bumper) of a lead vehicle and the front (e.g., a front bumper) of a following vehicle. That is, the tracking module 236 may include instructions that cause the processor 231 to identify, in an output of a vehicle sensor, the location of the rear of a lead vehicle and the front of a following vehicle, where the lead vehicle is at least partially controlling a movement of the following vehicle.

As described above, to more clearly indicate the presence of a virtual connection between the vehicles, the towbar presentation system 126 may project a digital representation of a non-existent physical connection between the vehicles. To enhance the effect, it may be desirable to localize the superimposed digital representation of the towbar relative to other components of vehicles in the virtual connection, specifically between the rear end of the lead vehicle and the front end of the following vehicle. For example, it may be desirable to project the representation of the towbar to replicate a physical towbar, with a lead vehicle end of the digital towbar appearing to be attached to a towbar receiver on the lead vehicle or another similar location and a following vehicle end of the digital towbar appearing to be attached to bumper hooks on the following vehicle, or to a frame member of the following vehicle. That is to say, the display parameters of the virtual towbar may be defined in part by the relative position of the lead vehicle and the following vehicle. Accordingly, the tracking module 236 may track the relative pose and position of the vehicles such that a realistic representation of the towbar may be superimposed on a display surface through which a real-world view of the lead and following vehicles is observed.

As such, the tracking module 236 may include a processor that can identify objects in sensor output and track such objects through various samples of the sensor output. In one particular example, the tracking module 236 may include an image sensor that can detect objects in an image, generate coordinates for the objects in three-dimensional space, and track the objects through multiple frames. While particular reference is made to image processing to identify and track objects through images, the tracking module 236 may identify and track objects in other types of sensor data 230 such as LiDAR sensor data, radar sensor data, and sonar sensor data. Similar to an image processor, the processor 231 may identify objects (such as an ado vehicle in the vicinity of the ego vehicle) in this other sensor data. In an example, the tracking module 236 may use various tracking modalities such as simultaneous localization and mapping (SLAM) to identify the location and position of objects in the vicinity of the vehicle.

In an example, the tracking module 236 may track particular portions of the objects in the vicinity of the ego vehicle. For example, the representation of the towbar may be superimposed on a following vehicle display surface over a presentation of a real-world view of the rear of the lead vehicle. In this example, the tracking module 236 may track a rear portion of the lead vehicle. As an even more specific example, the tracking module 236 may track a particular feature in the sensor data. For example, a physical towbar may attach to the lead vehicle at a particular location, such as a hitch. Accordingly, in this example the tracking module 236 may track a hitch of the lead vehicle. If the lead vehicle does not have a hitch, the tracking module 236 may track a centralized location of the lead vehicle that is beneath the rear bumper.

In another example, the representation of the towbar may be superimposed on a lead vehicle display surface over a presentation of a real-world view of the front of the following vehicle. In this example, the tracking module 236 may track a front portion of the following vehicle. As an even more specific example, the tracking module 236 may track a particular feature in the sensor data. For example, a physical towbar may attach to the following vehicle at a particular location, such as a portion of the frame below the front bumper. Accordingly, in this example, the tracking module 236 may track the frame of the following vehicle or a similar centralized location of the following vehicle that is beneath the front bumper. In either example, these tracked regions, or regions that may define the position of certain elements of the virtual towbar, may be referred to as anchor points.

The tracking module 236 may also track the location of certain features of the ego vehicle (e.g., towbar connection points), whether the ego vehicle is a lead vehicle or a following vehicle. For example, the location of these elements on the vehicle may be recorded in a vehicle database. The tracking module 236, relying in part on GPS information for the ego vehicle 100 and the known locations of the features as indicated in a vehicle database, may calculate coordinates for the ego vehicle anchor points in three-dimensional space.

As described, these tracked regions may define the presentation parameters of the representation of the towbar. As such, the tracking module 236 may include instructions that cause the processor 231 to map the coordinates of anchor points on the rear of the lead vehicle and coordinates of anchor points on the front of the following in three-dimensional space. In an example, the anchor points on the rear of the lead vehicle correspond to a lead vehicle towbar connection point, and the anchor points on the front of the following vehicle correspond to a following vehicle towbar connection point.

In an example, the tracking module 236 may track these objects over time and through various samples of sensor output. That is, during travel, the lead vehicle and the following vehicle may change pose or position, and the relative distance between the vehicles may change. For example, the lead vehicle may initiate a turn before the following vehicle, or the lead vehicle may apply brakes to slow down before the following vehicle is given a command to slow down. In these and other situations, the relative position between the lead vehicle and the following vehicle and the pose of the vehicles may change. Accordingly, the tracking module 236 tracks the movement of the vehicles and respective anchor points so that the representation of the towbar can be updated accordingly.

Figure 5:
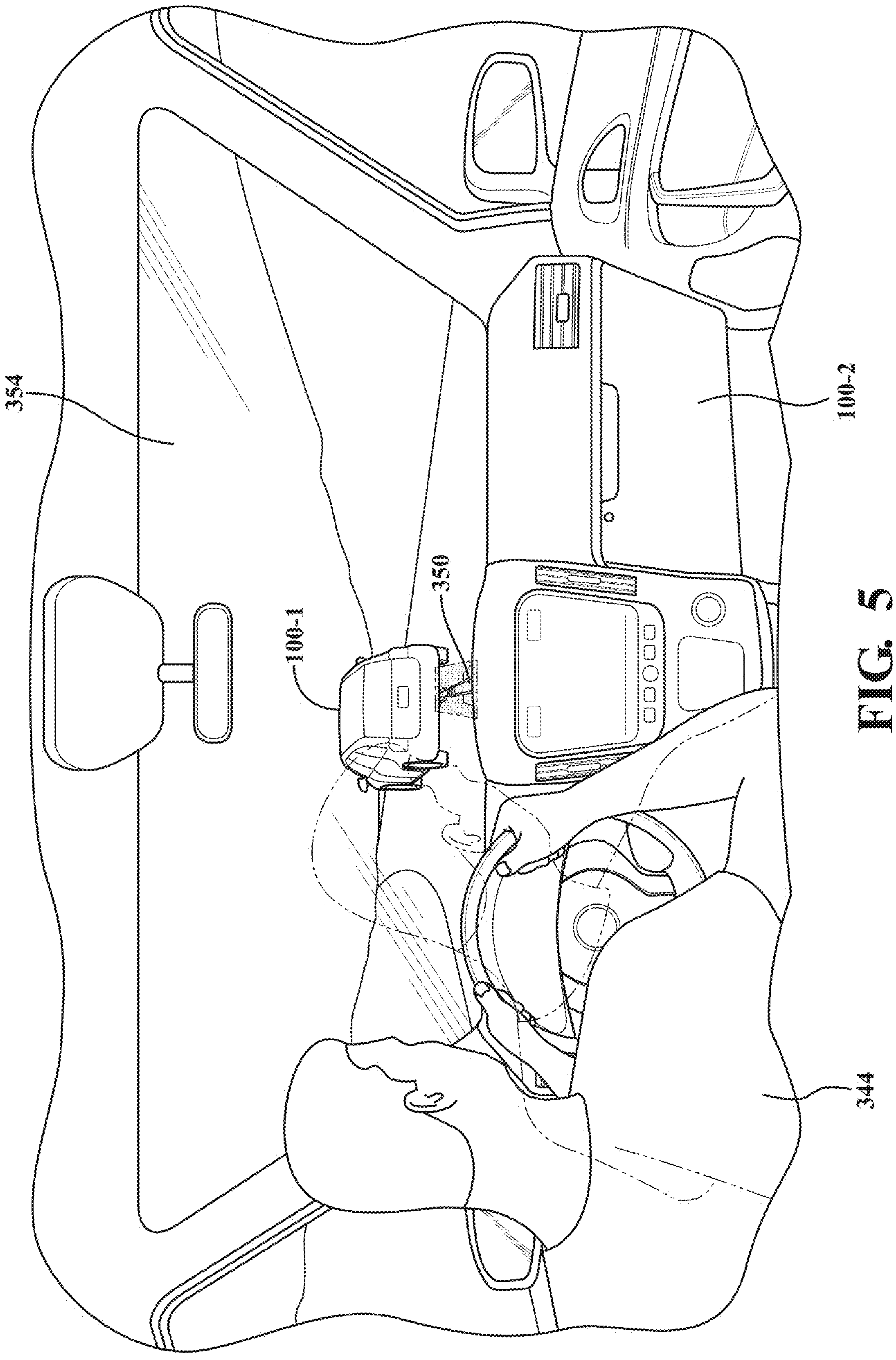
FIG. 5 illustrates the alteration of the projection of a representation of a towbar between two traveling vehicles based on a change in the position of a vehicle occupant or a vehicle.

In addition to tracking objects in the environment surrounding the vehicle 100, the tracking module 236 may track objects within the vehicle 100. Specifically, an occupant may change position within the vehicle 100. For example, an occupant may change a seat position, tilt their head, or otherwise move to different positions. As the occupant moves within the cabin, so does their viewing angle of the surrounding environment, specifically of the other vehicle in the virtual connection configuration. Accordingly, the tracking module 236 tracks the position of the occupant of the vehicle 100 such that the perspective of the representation of the towbar can be altered to align with the occupant's position. Specifically, the tracking module 236 may track one or more of the body, head, eye, and pupil position of the occupant. Based on this information, the tracking module 236 may be able to determine a gaze direction of the occupant. For example, by comparing the number of pixels in image data that correspond to the pupil of the occupant relative to other portions of the eye, an image processor may determine which direction the occupant is looking. Based on the output of this data, the display module 238 may alter the representation of the towbar to align with the gaze direction of the occupant as depicted in FIG. 5 and as described in the accompanying description.

While the tracking module 236 is discussed as controlling the various sensors to provide the sensor data 230, in one or more embodiments, the tracking module 236 can employ other techniques to acquire the sensor data 230 that are either active or passive. For example, the tracking module 236 may passively sniff the sensor data 230 from a stream of electronic information provided by the various sensors to further components within the vehicle 100. Moreover, the tracking module 236 can undertake various approaches to fuse data from multiple sensors when providing the sensor data 230. Thus, the sensor data 230, in one embodiment, represents a combination of perceptions acquired from multiple sensors.

In an example, the presentation of the towbar may occur when the lead vehicle and the following vehicle are in a hitchless/virtual towing configuration. In this example, the towbar presentation system 126 may trigger tracking of the location of the lead and following vehicle and the superimposition of the representation of the towbar based on when the lead vehicle and the following vehicle are in a virtual connection mode. That is, to effectuate the virtual connection between the first and second vehicles, a communication path is set up between the two such that one vehicle, i.e., the lead vehicle, can provide driving and other commands to the second vehicle in the virtual connection. The towbar presentation system 126 detects that the first and second vehicles are in a virtual connection mode in any number of ways. For example, the towbar presentation system 126 may identify a wireless communication path between the first and second vehicles. In another example, vehicles in the virtual connection mode may be set to certain operational states. In this example, the towbar presentation system 126 identifies the operational state of the vehicle 100 as indicia of the vehicle 100 being in the virtual connection mode. The virtual connection mode differs from a non-virtual connection mode in that while in a non-virtual connection mode, the vehicle 100 does not command another vehicle, nor is it commanded by another vehicle.

The towbar presentation system 126 also includes a display module 238, which includes instructions that cause the processor 231 to superimpose, on a display surface, a representation of a towbar between the lead vehicle and the following vehicle over a real-world view of the back of the lead vehicle and the front of the following vehicle. That is, the display module 238 may instruct a display device 242, such as the projection device depicted in FIGS. 3A and 3B, to generate digital content which will be presented on a display surface over a real-world depiction of the region between the lead vehicle and the following vehicle. As such, the display device 242 may be an augmented reality (AR) projection device where digital content (in this case the representation of the towbar) is superimposed on top of real-world elements as viewed on or through a display surface. In an example as depicted in FIGS. 4A-4C , the display surface may be transparent. In an example, as depicted in FIG. 4D, the display surface may be non-transparent, such as a rearview mirror or an infotainment display. In either case, the display device 242 generates digital content as instructed by the display module 238.

As described above, it may be the case that the coordinates of the anchor features in the perspective of the environmental sensors of the vehicle 100 are different than the coordinates of the anchor features in the perspective of the occupant of the vehicle 100. Accordingly, the display module 238 may include instructions that cause the processor 231 to convert the coordinates of the anchor points from the perspective of the vehicle sensor to the perspective of an occupant of the vehicle 100, whether the occupant is in the following vehicle or the lead vehicle. Specifically, the towbar presentation system 126 may be calibrated based on the spatial difference between the vehicle sensor location and various occupant positions within the vehicle 100.

Accordingly, the tracking module 236 tracks 1) the location of anchor features on the vehicles 100 and 2) the occupant position and/or gaze direction. Based on the relative location of these elements, the display module 238 identifies a coordinate mapping in the 3D mapping data 232 and transforms the anchor points from the perspective of the vehicle sensor to the perspective of the occupant. That is, the display module 238 may perform a perspective transformation of the anchor point coordinates to set the position of the representation of the towbar so that it appears realistic and accurately positioned relative to the lead vehicle and the following vehicle. Over time, the display module 238 dynamically adjusts the position of the representation of the towbar based on occupant movement to continuously align the representation of the towbar with the perspective of the occupant.

In another example, the display module 238, rather than relying on a lookup table to identify a perspective transformation, may calculate the perspective transformation based on collected information from the sensors. Specifically, as described above, the tracking module 236 may track the location of anchor points in sensor data. Moreover, as described above, the tracking module 236 may track the location of an occupant of the vehicle 100. In these cases, the display module 238 or the tracking module 236 may calculate the difference in position of the occupant and the sensors (e.g., a forward-facing camera or rear-facing camera), and perform a perspective transformation on the anchor points to ensure the anchor points align with the occupant's perspective.

In either case, the display module 238 includes instructions that cause the processor 231 to anchor the representation of the towbar to the anchor points. That is to say, the representation of the towbar may have certain features (e.g., connection point to the lead vehicle and connection point(s) to the following vehicle). The display module 238 may generate digital content where pixels corresponding to these certain features are assigned coordinates that match the corresponding anchor points on the respective vehicle.

Over time, as the coordinates change due to the vehicles moving relative to one another and/or the occupant changing position, as depicted in FIG. 5, the display module 238 alters the representation of the towbar to ensure the representation aligns with the perspective of the occupant. As such, the representation of the towbar is realistically superimposed over the image of the lead vehicle and the following vehicle in a way and in a position where an occupant would expect to see a physical towbar. This may assuage the fear, nervousness, or anxiety of the occupant of the vehicle 100. This virtual representation may also indicate a virtual connection to occupants of the vehicle 100 to prevent the occupants from performing a potentially dangerous driving maneuver such as a rapid acceleration or deceleration. Thus, the towbar presentation system 126 of the present specification enhances virtual connection operation by unambiguously indicating that a virtual connection exists between two vehicles.

In one or more configurations, the towbar presentation system 126 implements one or more machine learning algorithms. As described herein, a machine learning algorithm includes but is not limited to deep neural networks (DNN), including transformer networks, convolutional neural networks, recurrent neural networks (RNN), etc., Support Vector Machines (SVM), clustering algorithms, Hidden Markov Models, and so on. It should be appreciated that the separate forms of machine learning algorithms may have distinct applications, such as agent modeling, machine perception, and so on.

Moreover, it should be appreciated that machine learning algorithms are generally trained to perform a defined task. Thus, the training of the machine learning algorithm is understood to be distinct from the general use of the machine learning algorithm unless otherwise stated. That is, the towbar presentation system 126 or another system generally trains the machine learning algorithm according to a particular training approach, which may include supervised training, self-supervised training, reinforcement learning, and so on. In contrast to training/learning of the machine learning algorithm, the towbar presentation system 126 implements the machine learning algorithm to perform inference. Thus, the general use of the machine learning algorithm is described as inference.

Figure 3B:
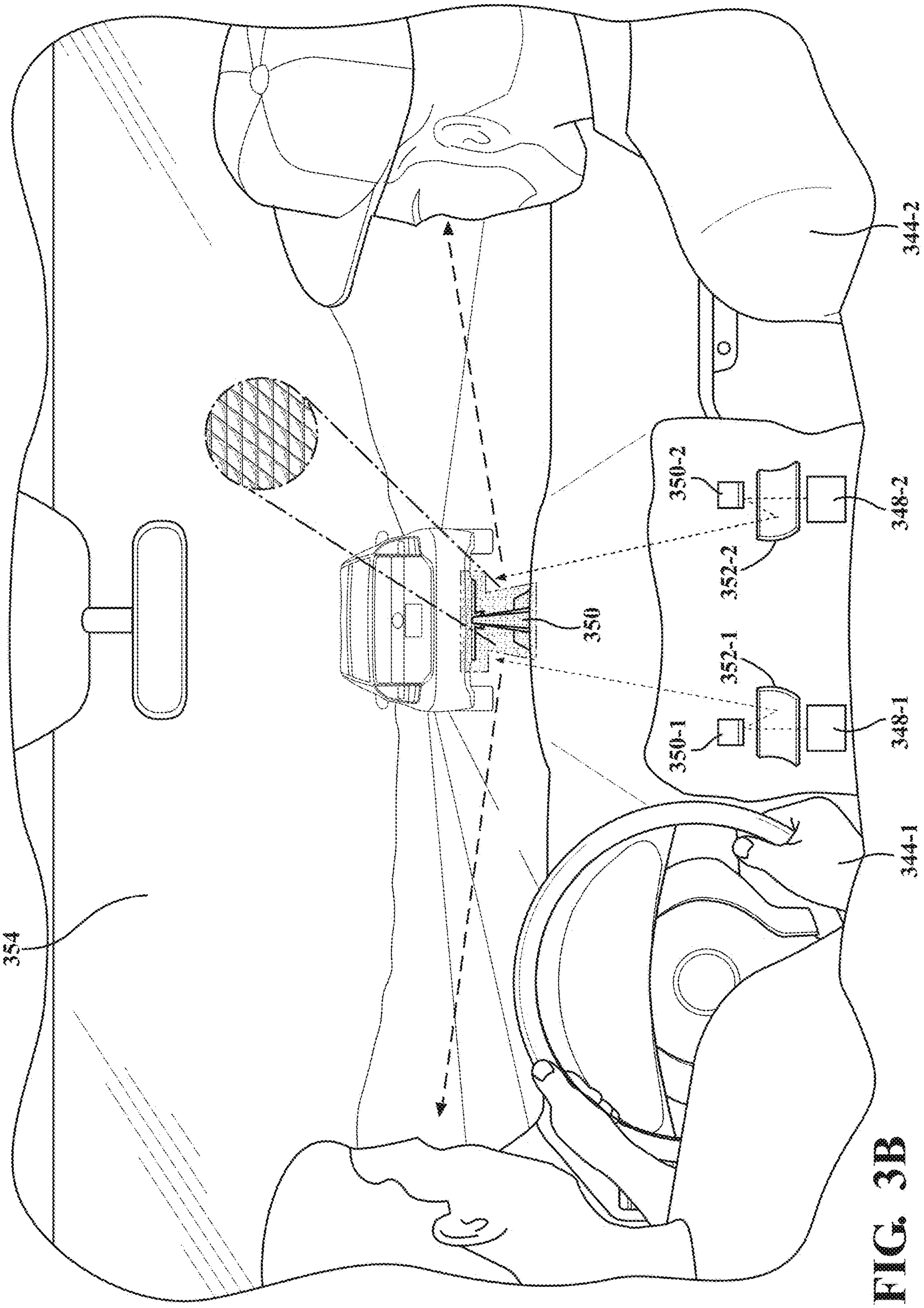

FIGS. 3A and 3B illustrate embodiments of a projection device 346 for projecting a representation of a towbar 350 between two traveling vehicles 100-1 and 100-2. The vehicles 100-1 and 100-2 may be examples of the vehicle 100 depicted in FIG. 1. As described above, the towbar presentation system 126 projects a representation of a towbar 350 over a real-world view of the environment in a realistic location relative to the lead vehicle 100-1 and the following vehicle 100-2. Specifically, the representation of the towbar 350 may be positioned to appear as if it were a real-world physical connection between the lead vehicle 100-1 and the following vehicle 100-2.

Note that in the figures that follow, the towbar 350 is depicted in a hatched region to indicate its differentiation from the real-world components viewable through the windshield 354 or another display surface. That is, the towbar 350 is not a real-world component that physically exists in the real world but is a virtual overlay of the real-world scene viewable on a display surface such as a windshield 354. Accordingly, in the present specification, this differentiation between virtual components and real-world components is indicated by virtual components being depicted in hatched regions.

Accordingly, the towbar presentation system 126 may include a display device 242 that generates the digital overlay. In an example, the display device 242 is a projection device 346. The projection device 346 may include an image generator 348, a set of mirrors 351 and 352, and a combiner. The image generator 348 may be disposed within the dashboard of the vehicle 100 and may generate the digital content to be displayed. The mirrors 351 and 352 re-direct the digital content from the image generator 348 to the combiner, which in the example depicted in FIG. 3A is found on the windshield 354 of the vehicle 100. Specifically, the windshield 354 may be coated with a reflective coating that 1) allows light from outside the vehicle 100 to enter and 2) re-directs light from inside the vehicle 100 toward the occupant 344 in the vehicle 100. In other examples, instead of projecting onto the windshield 354, the projection device 346 may project the light onto a separate transparent substrate, such as a heads-up display in front of the windshield 354.

During operation, the towbar presentation system 126 acquires real-world images, such as from a forward-facing camera 108-2 on the front of the following vehicle 100-2. As described above, this sensor data allows the towbar presentation system 126 to locate real-world elements that may serve as anchor points or may otherwise define the display parameters for the representation of the towbar 350. The projection device 346 may then project the digital content (i.e., the representation of the towbar 350), which is bounced off the mirrors 351 and 352 to ultimately be projected onto the display surface, which in the example depicted in FIG. 3A is the vehicle windshield 354.

Note that the lead vehicle 100-1 may include a similar projection device that relies on data from a rear-facing sensor, such as a rear-facing camera 108-1. In this example, the projection device on the lead vehicle 100-1 may project the digital representation of the towbar 350 on the rear windshield of the lead vehicle 100-1, as depicted in FIG. 4C, such that an occupant may observe and be reassured by the digital towbar as they turn their head to look through the rear windshield or by viewing the following vehicle 100-2 through the rearview mirror.

As described above and as depicted in FIG. 3A, it may be that the perspective of the sensor (e.g., the forward-facing camera 108-2) is different from that of the occupant 344 of the following vehicle 100-2. If this difference in perspective is not accounted for, the representation of the towbar 350 may not be properly overlaid between the lead vehicle 100-1 and the following vehicle 100-2. Accordingly, as described above, the display module 238 performs perspective adjustment of the anchor points identified in the sensor output to correctly align the digital content (i.e., the representation of the towbar 350) with the occupant's 344 perspective. Such a perspective alteration may also account for the windshield's curvature, for example, by offsetting the parallax that may occur when projecting onto a curved surface such as the windshield 354.

As described above, the position of the occupant 344 may affect the representation of the towbar 350. For example, a representation of the towbar 350 adjusted to the perspective of a first occupant 344-1 (i.e., the driver) may appear incorrect to a second occupant 344-2 on account of the different viewpoints of the first occupant 344-1 and the second occupant 344-2. In an example, to accommodate this scenario, the towbar presentation system 126 may include an additional projection device with an additional image generator 348-2 as depicted in FIG. 3B. That is, the system may include a projection device 346 per occupant, each projection device 346 including an image generator 348-1 and 348-2 and mirrors 351-1, 352-1 and 351-2 and 352-2, respectively. In this example, the combiner, which may be a reflective film on the windshield 354, may be a multi-directional combiner that 1) directs a first representation of the towbar 350 from the respective image generator 348-1 to a first occupant 344-1, which first representation is a view from a first perspective and 2) directs a second representation of the towbar 350 from the respective image generator 348-2 to a second occupant 344-2, which second representation is a view from a second perspective. In this example, the images reflected from the mirrors may be directed to a shared, rather than individualized, combiner.

To display the personalized towbar representations, the combiner, in this example the windshield 354, may have an array of multi-view pixels as depicted in FIG. 3B, each capable of emitting light in a plurality of directions. The direction of light emitted may be controlled to display personalized visual content, such as an occupant-specific representation of the towbar 350 to individual occupants 344-1 and 344-2. In this manner, the different occupants 344-1 and 344-2 may see the towbar from their viewpoint-specific perspective. That is, the first occupant 344-1 (i.e., the driver) may see a first representation of the towbar 350 that is generated to look appropriate from the eye point of the first occupant 344-1. Similarly, the second occupant 344-2 (i.e., the passenger) may see a second representation of the towbar 350 that is generated to look appropriate from the eye point of the second occupant 344-2.

FIGS. 4A-4D illustrate embodiments of the projection of a representation of a towbar 350 between two traveling vehicles 100-1 and 100-2. Specifically, FIGS. 4A-4D depict various display surfaces on which the representation of the towbar 350 may be presented. FIGS. 4A and 4B depict the display surfaces in the following vehicle 100-2 while FIGS. 4C and 4D depict the display surfaces in the lead vehicle 100-1.

As depicted In FIG. 4A, the display surface may be a transparent front windshield of the following vehicle 100-2. In this example, vehicle sensors, such as a forward-facing camera 108-2 may capture data indicating objects in the environment, specifically of a lead vehicle 100-1, and identify anchor points on the lead vehicle 100-1, such as a hitch or a predetermined location on the lead vehicle 100-1 where a user may expect to see a tow bar connected. The tracking module 236 may identify certain features as anchor points, generate coordinates for the anchor points in three-dimensional space, and convert the coordinates of the anchor points from the perspective of the forward-facing camera 108-2 to the perspective of one or more vehicle occupants 344. The display module 238 may then anchor certain features of the representation of the towbar 350 (e.g., vehicle connection points) to the anchor points as described above.

Note that the form of the representation of the towbar 350 may vary. For example, the display module 238 may include instructions that cause the processor 231 to superimpose a virtual towbar graphic over the real-world view. In another example, the display module 238 may include instructions that cause the processor 231 to superimpose an image or a video stream of an actual towbar over the real-world view.

In another example, the display module 238 may include instructions that cause the processor 231 to superimpose a representation of a spring-loaded towbar 350 over the real-world view. As the relative distance between the lead vehicle 100-1 and the following vehicle 100-2 changes, the spring-loaded towbar representation may extend or contract, thus reassuring an occupant that the change in position is intended and safe. The animated towbar in this example may also further improve virtual connection configurations by indicating the current operational state of the system, that is that the automated driving modules 125 are adjusting the relative position of the vehicles.

In the example depicted in FIG. 4B, the display surface is a transparent lens 456 of a head-mounted display. In this example, the projection device 346 (i.e., the image generator 348 and mirrors 351, 352) may be mounted to a frame 458 of the head-mounted display with the combiner being the transparent lens 456. In this example, the projection device 346 may operate as described above by projecting the representation of the towbar 350 onto the transparent lens 456. In this example, the towbar presentation system 126 may communicate wirelessly via the communication system 127 to acquire the sensor data from the vehicle 100.

While FIGS. 4A and 4B depict the overlay of a representation of the towbar 350 behind a lead vehicle 100-1, in the example depicted in FIGS. 4C and 4D, the towbar presentation system 126 superimposes a representation of the towbar 350 in front of a following vehicle 100-2. In this example, the display surface is the transparent rear window 460 of the lead vehicle 100-1.

As described above, vehicle sensors, such as a rear-facing camera 108-1 may capture data indicating objects in the environment, specifically of a following vehicle 100-2, and identify anchor points on the following vehicle 100-2, such as a portion of a frame of the following vehicle 100-2 or a predetermined location on the following vehicle 100-2 where a user may expect to see a tow bar connected. The tracking module 236 may identify certain features as anchor points, generate coordinates for the anchor points in three-dimensional space, and convert the coordinates of the anchor points from the perspective of the rear-facing camera 108-1 to the perspective of one or more vehicle occupants 344. The display module 238 may then anchor certain features of the representation of the towbar 350 (e.g., vehicle connection points) to the anchor points as described above. In this example, a driver of the lead vehicle 100-1 may view the representation of the towbar 350 by looking over their shoulder or glancing in their rearview mirror.

In some examples, the display surface is not transparent, but another type of display surface. For example, some vehicles may be equipped with a display screen 462, for example as part of an infotainment system. The display screen 462 may be adapted to present a view of a rear-facing camera 108-1. In this example, rather than generating digital content on a transparent screen, the display device 242 may generate a digital representation of the towbar 350 on a display screen 462, such as a light-emitting diode (LED) screen, which digital representation is overlaid on the feed from the rear-facing camera 108-1 that is presented on the display screen 462. A similar presentation may be provided on a display screen of a following vehicle 100-2, which display screen of the following vehicle 100-2 presents a stream from the forward-facing camera 108-2 of the following vehicle 100-2.

In an example, a vehicle is equipped with a rearview mirror 464 with a portion of the rearview mirror 464 including a display screen that provides a stream of the rear-facing camera 108-1. In this example, the display device 242 may generate the digital presentation of the towbar 350 on a display screen portion of the rearview mirror 464 overlaid on top of the stream of the rear-facing camera 108-1.

FIG. 5 illustrates the alteration of the projection of a representation of a towbar 350 between two traveling vehicles 100-1 and 100-2, based on a change in position of a vehicle occupant 344 or a vehicle 100-1 and 100-2. As vehicles 100-1 and 100-2 travel along a road, the relative position of the vehicles 100-1 and 100-2 changes. For example, as depicted in FIG. 5, the vehicles 100-1 and 100-2 may encounter a turn and in navigating the turn may become closer or farther apart. Moreover, the poses of the vehicles 100-1 and 100-2 relative to one another may change. Were the representation of the towbar 350 not updated, it may appear unnatural. For example, as the lead vehicle 100-1 turns to the left as depicted, the representation of the towbar 350 may become more obscured by the hood line of the following vehicle 100-2. Accordingly, the tracking module 236 may track the position of the lead vehicle 100-1 and the following vehicle 100-2 over time, and more specifically, track the regions of the vehicles 100-1 and 100-2 identified as anchor points, and update the projection of the representation of the towbar 350 accordingly.

Further, as described above, the occupant 344 of the vehicle 100-2 may change their position. For example, the occupant 344 may move their seat closer or farther away from the steering wheel, tilt their head, etc. These slight changes to the position of the occupant 344 also change their viewing angle of the real world. Were the representation of the towbar 350 not updated to reflect these changes in viewing angle, the representation may appear unnatural and may therefore not provide the intended calming effect or may signal to the occupant 344 that there is a malfunction with some vehicle system, both of which may result in an undesirable scenario where an occupant acts irrationally or dangerously. Accordingly, the tracking module 236 may include instructions that cause the processor 231 to track a movement of at least one of the lead vehicle 100-1, the following vehicle 100-2, an occupant 344 of the lead vehicle 100-1, or an occupant 344 of the following vehicle 100-2 and the display module 238 may include instructions that cause the processor 231 to adjust the representation of the towbar 350 based on the tracked movement.

Accordingly, the present towbar presentation system 126 generates a view that indicates a virtual connection between two vehicles. In so doing, the towbar presentation system 126 announces the virtual connection, which may be a safety-enhancing feature not previously available in autonomously controlled vehicles.

FIG. 1 will now be discussed in full detail as an example environment within which the system and methods disclosed herein may operate. In some instances, the vehicle 100 is configured to switch selectively between an autonomous mode, one or more semi-autonomous modes, and/or a manual mode. "Manual mode" means that all of or a majority of the control and/or maneuvering of the vehicle is performed according to inputs received via manual human-machine interfaces (HMIs) (e.g., steering wheel, accelerator pedal, brake pedal, etc.) of the vehicle 100 as manipulated by a user (e.g., human driver). In one or more arrangements, the vehicle 100 can be a manually-controlled vehicle that is configured to operate in only the manual mode.

In one or more arrangements, the vehicle 100 implements some level of automation in order to operate autonomously or semi-autonomously. As used herein, automated control of the vehicle 100 is defined along a spectrum according to the SAE J3016 standard. The SAE J3016 standard defines six levels of automation from level zero to five. In general, as described herein, semi-autonomous mode refers to levels zero to two, while autonomous mode refers to levels three to five. Thus, the autonomous mode generally involves control and/or maneuvering of the vehicle 100 along a travel route via a computing system to control the vehicle 100 with minimal or no input from a human driver. By contrast, the semi-autonomous mode, which may also be referred to as advanced driving assistance system (ADAS), provides a portion of the control and/or maneuvering of the vehicle via a computing system along a travel route with a vehicle operator (i.e., driver) providing at least a portion of the control and/or maneuvering of the vehicle 100.

With continued reference to the various components illustrated in FIG. 1, the vehicle 100 includes one or more processors 101. In one or more arrangements, the processor(s) 101 can be a primary/centralized processor of the vehicle 100 or may be representative of many distributed processing units. For instance, the processor(s) 101 can be an electronic control unit (ECU). Alternatively, or additionally, the processors include a central processing unit (CPU), a graphics processing unit (GPU), an ASIC, an microcontroller, a system on a chip (SoC), and/or other electronic processing units that support operation of the vehicle 100.

The vehicle 100 can include one or more data stores 118 for storing one or more types of data. The data store 118 can be comprised of volatile and/or non-volatile memory. Examples of memory that may form the data store 118 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, solid-state drivers (SSDs), and/or other non-transitory electronic storage medium. In one configuration, the data store 118 is a component of the processor(s) 101. In general, the data store 118 is operatively connected to the processor(s) 101 for use thereby. The term "operatively connected," as used throughout this description, can include direct or indirect connections, including connections without direct physical contact.

In one or more arrangements, the one or more data stores 118 include various data elements to support functions of the vehicle 100, such as semi-autonomous and/or autonomous functions. Thus, the data store 118 may store map data 119 and/or sensor data 122. The map data 119 includes, in at least one approach, maps of one or more geographic areas. In some instances, the map data 119 can include information about roads (e.g., lane and/or road maps), traffic control devices, road markings, structures, features, and/or landmarks in the one or more geographic areas. The map data 119 may be characterized, in at least one approach, as a high-definition (HD) map that provides information for autonomous and/or semi-autonomous functions.

In one or more arrangements, the map data 119 can include one or more terrain maps 120. The terrain map(s) 120 can include information about the ground, terrain, roads, surfaces, and/or other features of one or more geographic areas. The terrain map(s) 120 can include elevation data in the one or more geographic areas. In one or more arrangements, the map data 119 includes one or more static obstacle maps 121. The static obstacle map(s) 121 can include information about one or more static obstacles located within one or more geographic areas. A "static obstacle" is a physical object whose position and general attributes do not substantially change over a period of time. Examples of static obstacles include trees, buildings, curbs, fences, and so on.

The sensor data 122 is data provided from one or more sensors of the sensor system 102. Thus, the sensor data 122 may include observations of a surrounding environment of the vehicle 100 and/or information about the vehicle 100 itself. In some instances, one or more data stores 118 located onboard the vehicle 100 store at least a portion of the map data 119 and/or the sensor data 122. Alternatively, or in addition, at least a portion of the map data 119 and/or the sensor data 122 can be located in one or more data stores 118 that are located remotely from the vehicle 100.

As noted above, the vehicle 100 can include the sensor system 102. The sensor system 102 can include one or more sensors. As described herein, "sensor" means an electronic and/or mechanical device that generates an output (e.g., an electric signal) responsive to a physical phenomenon, such as electromagnetic radiation (EMR), sound, etc. The sensor system 102 and/or the one or more sensors can be operatively connected to the processor(s) 101, the data store(s) 118, and/or another element of the vehicle 100.

Various examples of different types of sensors will be described herein. However, it will be understood that the embodiments are not limited to the particular sensors described. In various configurations, the sensor system 102 includes one or more vehicle sensors 103 and/or one or more environment sensors. The vehicle sensor(s) 103 function to sense information about the vehicle 100 itself. In one or more arrangements, the vehicle sensor(s) 103 include one or more accelerometers, one or more gyroscopes, an inertial measurement unit (IMU), a dead-reckoning system, a global navigation satellite system (GNSS), a global positioning system (GPS), and/or other sensors for monitoring aspects about the vehicle 100.

As noted, the sensor system 102 can include one or more environment sensors 104 that sense a surrounding environment (e.g., external) of the vehicle 100 and/or, in at least one arrangement, an environment of a passenger cabin of the vehicle 100. For example, the one or more environment sensors 104 sense objects the surrounding environment of the vehicle 100. Such obstacles may be stationary objects and/or dynamic objects. Various examples of sensors of the sensor system 102 will be described herein. The example sensors may be part of the one or more environment sensors 104 and/or the one or more vehicle sensors 103. However, it will be understood that the embodiments are not limited to the particular sensors described. As an example, in one or more arrangements, the sensor system 102 includes one or more radar sensors 105, one or more LiDAR sensors 106, one or more sonar sensors 107 (e.g., ultrasonic sensors), and/or one or more cameras 108 (e.g., monocular, stereoscopic, RGB, infrared, etc.).

Continuing with the discussion of elements from FIG. 1, the vehicle 100 can include an input system 123. The input system 123 generally encompasses one or more devices that enable the acquisition of information by a machine from an outside source, such as an operator. The input system 123 can receive an input from a vehicle passenger (e.g., a driver/operator and/or a passenger). Additionally, in at least one configuration, the vehicle 100 includes an output system 124. The output system 124 includes, for example, one or more devices that enable information/data to be provided to external targets (e.g., a person, a vehicle passenger, another vehicle, another electronic device, etc.).

Furthermore, the vehicle 100 includes, in various arrangements, one or more vehicle systems 109. Various examples of the one or more vehicle systems 109 are shown in FIG. 1. However, the vehicle 100 can include a different arrangement of vehicle systems. It should be appreciated that although particular vehicle systems are separately defined, each or any of the systems or portions thereof may be otherwise combined or segregated via hardware and/or software within the vehicle 100. As illustrated, the vehicle 100 includes a propulsion system 110, a braking system 111, a steering system 112, a throttle system 113, a transmission system 114, a signaling system 115, and a navigation system 116.

The navigation system 116 can include one or more devices, applications, and/or combinations thereof to determine the geographic location of the vehicle 100 and/or to determine a travel route for the vehicle 100. The navigation system 116 can include one or more mapping applications to determine a travel route for the vehicle 100 according to, for example, the map data 119. The navigation system 116 may include or at least provide connection to a global positioning system, a local positioning system or a geolocation system.

In one or more configurations, the vehicle systems 109 function cooperatively with other components of the vehicle 100. For example, the processor(s) 101, the towbar presentation system 126, and/or automated driving module(s) 125 can be operatively connected to communicate with the various vehicle systems 109 and/or individual components thereof. For example, the processor(s) 101 and/or the automated driving module(s) 125 can be in communication to send and/or receive information from the various vehicle systems 109 to control the navigation and/or maneuvering of the vehicle 100. The processor(s) 101 and/or the automated driving module(s) 125 may control some or all of these vehicle systems 109.

For example, when operating in the autonomous mode, the processor(s) 101 and/or the automated driving module(s) 125 control the heading and speed of the vehicle 100. The processor(s) 101, and/or the automated driving module(s) 125 cause the vehicle 100 to accelerate (e.g., by increasing the supply of energy/fuel provided to a motor), decelerate (e.g., by applying brakes), and/or change direction (e.g., by steering the front two wheels). As used herein, "cause" or "causing" means to make, force, compel, direct, command, instruct, and/or enable an event or action to occur either in a direct or indirect manner.

As shown, the vehicle 100 includes one or more actuators 117 in at least one configuration. The actuators 117 are, for example, elements operable to move and/or control a mechanism, such as one or more of the vehicle systems 109 or components thereof responsive to electronic signals or other inputs from the processor(s) 101 and/or the automated driving module(s) 125. The one or more actuators 117 may include motors, pneumatic actuators, hydraulic pistons, relays, solenoids, piezoelectric actuators, and/or another form of actuator that generates the desired control.

As described previously, the vehicle 100 can include one or more modules, at least some of which are described herein. In at least one arrangement, the modules are implemented as non-transitory computer-readable instructions that, when executed by the processor 101, implement one or more of the various functions described herein. In various arrangements, one or more of the modules are a component of the processor(s) 101, or one or more of the modules are executed on and/or distributed among other processing systems to which the processor(s) 101 is operatively connected. Alternatively, or in addition, the one or more modules are implemented, at least partially, within hardware. For example, the one or more modules may be comprised of a combination of logic gates (e.g., metal-oxide-semiconductor field-effect transistors (MOSFETs)) arranged to achieve the described functions, an application-specific integrated circuit (ASIC), programmable logic array (PLA), field-programmable gate array (FPGA), and/or another electronic hardware-based implementation to implement the described functions. Further, in one or more arrangements, one or more of the modules can be distributed among a plurality of the modules described herein. In one or more arrangements, two or more of the modules described herein can be combined into a single module.

Furthermore, the vehicle 100 may include one or more automated driving modules 125. The automated driving module(s) 125, in at least one approach, receive data from the sensor system 102 and/or other systems associated with the vehicle 100. In one or more arrangements, the automated driving module(s) 125 use such data to perceive a surrounding environment of the vehicle. The automated driving module(s) 125 determine a position of the vehicle 100 in the surrounding environment and map aspects of the surrounding environment. For example, the automated driving module(s) 125 determines the location of obstacles or other environmental features including traffic signs, trees, shrubs, neighboring vehicles, pedestrians, etc.

The automated driving module(s) 125 can be configured to determine travel path(s), current autonomous driving maneuvers for the vehicle 100, future autonomous driving maneuvers and/or modifications to current autonomous driving maneuvers based on data acquired by the sensor system 102 and/or another source. In general, the automated driving module(s) 125 functions to, for example, implement different levels of automation, including advanced driving assistance (ADAS) functions, semi-autonomous functions, and fully autonomous functions, as previously described.

Moreover, the towbar presentation system 126, as provided for within the vehicle 100, functions in cooperation with a communication system 127. In one embodiment, the communication system 127 communicates according to one or more communication standards. For example, the communication system 127 can include multiple different antennas/transceivers and/or other hardware elements for communicating at different frequencies and according to respective protocols. The communication system 127, in one arrangement, communicates via a communication protocol, such as a WiFi, DSRC, V2I, V2V, or another suitable protocol for communicating between the vehicle 100 and other entities in the cloud environment. Moreover, the communication system 127, in one arrangement, further communicates according to a protocol, such as global system for mobile communication (GSM), Enhanced Data Rates for GSM Evolution (EDGE), Long-Term Evolution (LTE), 5G, or another communication technology that provides for the vehicle 100 communicating with various remote devices (e.g., a cloud-based server). In any case, the towbar presentation system 126 can leverage various wireless communication technologies to provide communications to other entities, such as members of the cloud-computing environment.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. The systems, components and/or processes also can be embedded in a computer-readable storage, such as a computer program product or other data program storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. A non-exhaustive list of the computer-readable storage medium can include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or a combination of the foregoing. In the context of this document, a computer-readable storage medium is, for example, a tangible medium that stores a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:

a processor;

a memory storing machine-readable instructions that, when executed by the processor, cause the processor to:

track, in an output of a vehicle sensor, a location of a rear of a lead vehicle and a front of a following vehicle, the lead vehicle is at least partially controlling a movement of the following vehicle; and superimpose, on a display surface, a representation of a towbar between the lead vehicle and the following vehicle over a real-world view of the rear of the lead vehicle and the front of the following vehicle.

2. The system of claim 1, wherein the display surface comprises at least one of:

a transparent front windshield of the following vehicle;

a transparent rear window of the lead vehicle;

a display screen of the lead vehicle;

a display screen of the following vehicle;

a rearview mirror of the lead vehicle; or a transparent lens of a head-mounted display.

3. The system of claim 1, further comprising a projection device comprising an image generator, at least one mirror, and a combiner, the projection device generates the representation of the towbar on the display surface.

4. The system of claim 3:

further comprising an additional projection device; and wherein:

the combiner is a multi-directional combiner shared between the projection device and the additional projection device, the multi-directional combiner:

directs a first representation of the towbar from the projection device to a first occupant, the first representation is a view of the towbar from a first perspective; and directs a second representation of the towbar from the additional projection device to a second occupant, the second representation is a view of the towbar from a second perspective different from the first perspective.

5. The system of claim 1, wherein the machine-readable instructions further comprise machine-readable instructions that, when executed by the processor, cause the processor to:

track a movement of at least one of the lead vehicle, the following vehicle, an occupant of the lead vehicle, or an occupant of the following vehicle; and adjust the representation of the towbar based on a tracked movement.

6. The system of claim 1, wherein the machine-readable instructions further comprise machine-readable instructions that, when executed by the processor, cause the processor to:

map coordinates of anchor points on the rear of the lead vehicle and coordinates of anchor points on the front of the following vehicle in three-dimensional space;

convert the coordinates of the anchor points from a perspective of the vehicle sensor to a perspective of at least one of an occupant of the following vehicle or an occupant of the lead vehicle; and anchor the representation of the towbar to the anchor points.

7. The system of claim 6, wherein:

the anchor points on the rear of the lead vehicle correspond to a lead vehicle towbar connection point; and the anchor points on the front of the following vehicle correspond to a following vehicle towbar connection point.

8. The system of claim 1, wherein the machine-readable instruction that causes the processor to superimpose, on the display surface, the representation of the towbar over the real-world view comprises a machine-readable instruction that causes the processor to superimpose, on the display surface, a virtual towbar graphic over the real-world view.

9. The system of claim 1, wherein the machine-readable instruction that causes the processor to superimpose, on the display surface, the representation of the towbar over the real-world view comprises a machine-readable instruction that causes the processor to superimpose, on the display surface, at least one of an image or a video stream of a towbar over the real-world view.

10. A system, comprising:

a processor;

a memory storing machine-readable instructions that, when executed by the processor, cause the processor to:

track, in an output of a vehicle sensor, a location of a rear of a lead vehicle and a front of a following vehicle, the lead vehicle is at least partially controlling a movement of the following vehicle; and superimpose, on a display surface, a representation of a spring-loaded towbar that extends and contracts based on a change in distance between the lead vehicle and the following vehicle over a real-world view of the rear of the lead vehicle and the front of the following vehicle.

* * * * *